(12) United States Patent
Oshigiri

(10) Patent No.: US 6,952,579 B2
(45) Date of Patent: Oct. 4, 2005

(54) WIRELESS LOCAL LOOP ACCESS NETWORK SYSTEM

(75) Inventor: Hiroshi Oshigiri, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 09/741,578

(22) Filed: Dec. 19, 2000

(65) Prior Publication Data

US 2001/0014584 A1 Aug. 16, 2001

(30) Foreign Application Priority Data

Dec. 20, 1999 (JP) .......................................... 11-360201

(51) Int. Cl.[7] .............................................. H04Q 7/20
(52) U.S. Cl. .................. 455/426.2; 455/3.01; 455/3.03; 455/445
(58) Field of Search .......................... 455/426.2, 426.1, 455/412.1, 3.01, 3.03, 415, 424, 435.1, 435.2, 433, 517, 528, 527, 445, 560, 555, 422.1, 411, 410; 370/330, 342, 347

(56) References Cited

U.S. PATENT DOCUMENTS

| | | | |
|---|---|---|---|
| 5,475,735 A | | 12/1995 | Williams et al. |
| 5,729,536 A | * | 3/1998 | Doshi et al. ................ 370/398 |
| 5,884,148 A | * | 3/1999 | Bilgic et al. ............. 455/404.1 |
| 6,002,919 A | | 12/1999 | Posti |
| 6,185,412 B1 | * | 2/2001 | Pentikainen et al. ..... 455/404.1 |
| 6,397,069 B1 | * | 5/2002 | Biedermann et al. ........ 455/450 |
| 6,424,835 B1 | * | 7/2002 | Shin ........................... 455/517 |
| 6,532,364 B1 | * | 3/2003 | Uchida et al. ............... 455/436 |
| 6,571,109 B1 | * | 5/2003 | Kim ........................... 455/555 |
| 6,590,878 B1 | * | 7/2003 | Uchida et al. .............. 370/330 |

FOREIGN PATENT DOCUMENTS

| | | |
|---|---|---|
| CN | 1202296 A | 12/1998 |
| JP | 3-198497 | 8/1991 |
| JP | 9-214467 | 8/1997 |
| JP | 9-247755 | 9/1997 |
| JP | 10-51858 | 2/1998 |
| JP | 11-8694 | 1/1999 |
| JP | 11-122667 | 4/1999 |
| JP | 11-127468 | 5/1999 |
| JP | 200-13838 | 1/2000 |

OTHER PUBLICATIONS

Chinese Office Action dated May 9, 2003 (w/ English translation).
Japanese Office Action dated Jul. 23, 2002 (w/ English translation of relevant portion ).

* cited by examiner

*Primary Examiner*—Nay Maung
*Assistant Examiner*—John J. Lee
(74) *Attorney, Agent, or Firm*—Dickstein Shapiro Morin & Oshinsky LLP

(57) ABSTRACT

A wireless local loop access network system includes (a) at least one base station (13) making radio communication with a plurality of subscriber's terminals, and (b) a base station controller (14) controlling the base station (13) and connected to a public switched telephone network. The base station controller (14) includes a memory (16) for storing subscriber data therein. For instance, the memory (16) stores a first identifier used for identifying a subscriber in an interface protocol between the wireless local loop access network system and the public switched telephone network, a second identifier used for identifying a subscriber in an radio-signal interface protocol in the wireless local loop access network system, and data about correspondence between the first and second identifiers.

13 Claims, 6 Drawing Sheets

WIRELESS LOCAL LOOP ACCESS NETWORK SYSTEM

BACKGROUND OF THE INVENTION

1. Field of the Invention

The invention relates to a wireless local loop access network system, and more particularly to a wireless local loop access network system to which a public switched telephone network can be connected in the same conditions as conditions in which a public switched telephone network is connected to a wire access network.

2. Description of the Related Art

In construction of subscriber's lines between an exchange station in a public switched telephone network and subscribers, a wireless local loop (WLL) system is recently often selected in place of a wire access system in which an exchange station and subscribers are connected to each other through a copper wire or an optical fiber. In a wireless local loop system, an interface for mobile communication, such as PDS, PHS or CDMA, is used in radio lines. A conventional telephone as a subscriber's terminal may be used by connecting a mobile communication terminal or a specific terminal thereto.

FIG. 1 is a block diagram of a conventional wireless local loop access network system.

The wireless local loop access network system 100 is comprised of a subscriber unit (SU) 2 acting as the CDMA radio interface between the wireless local loop access network system 100 and a subscriber's telephone 1, first and second nodes or base station transceivers (BTS) 3 and 7 acting as the CDMA radio interface between the wireless local loop access network system 100 and the subscriber unit 2, and a node or wireless local loop base station controller (WSC) 4 connecting to a node or local exchange (LE) 5 in a public switched telephone network 101 in accordance with an interface identified as V5.2.

The subscriber's telephone 1 and the subscriber unit 2 are connected to each other through a copper wire acting as an analog interface, and both are set in a subscriber's house 102.

Though the illustrated wireless local loop access network system 100 includes the first and second base station transceivers 3 and 7, it is assumed herein that the subscriber unit 2 makes communication with the first base station transceiver 3.

The first and second base station transceivers 3 and 7 are connected to the base station controller 4 through an El interface and a program inherent to the wireless local loop access network system 100, as an upper layer of the El interface.

In the conventional wireless local loop access network system 100 illustrated in FIG. 1, the local exchange 5 has to operate taking into consideration that a subscriber is connected to the wireless local loop access network system 100 through a radio interface, in order to convert between a subscriber identifier corresponding to a protocol between the wireless local loop access network system 100 and the public switched telephone network 101, and a subscriber identifier in a radio protocol.

In addition, the subscriber unit 2, the base station transceiver 3, and the base station controller 4 have to include a specific structure for the same reasons as mentioned above.

Furthermore, the conventional wireless local loop access network system 100 is accompanied with a problem of an overhead in data access.

Japanese Unexamined Patent Publication No. 9-214467 has suggested a base station used in CDMA wireless local loop system. The base station uses diffusion codes perpendicular to each other in links in forward and reverse directions between the base station and a subscriber station. The base station includes a controller which controls a subscriber station such that a signal received from the subscriber station is in synchronization with the diffusion codes in a chip period.

Japanese Unexamined Patent Publication No. 9-247755 has suggested a wireless access system for connecting a public switched telephone network to a subscriber's terminal through radio signals. The subscriber's terminal includes a first detector which detects a non-telephone signal, and a first controller which transmits a detection signal indicative of detection of the non-telephone signal, through a control channel, and transmits the non-telephone signal through a data channel, bypassing a voice code decoder. Between the base station and the public switched telephone network is arranged a second controller which transmits the non-telephone signal transmitted through the data channel, to the public switched telephone network, bypassing a second voice code decoder, when the above-mentioned detection signal has been detected.

Japanese Unexamined Patent Publication No. 11-8694 has suggested an exchange arranged in a network in which a plurality of exchanges are connected to one another. The exchange includes a virtual access network unit which causes a second exchange to deal with communication of a subscriber to be managed by the exchange, a memory storing data indicating whether a subscriber to be managed by the exchange makes use of the virtual access network unit, and means for assigning a certain subscriber among subscribers to be managed by the exchanger, to the virtual access network unit, based on the data stored in the memory.

Japanese Unexamined Patent Publication No. 11-122667 has suggested a method of relaying communication in a system including base stations each making radio communication with a plurality of subscriber's terminals, a base station controller which controls the base stations, and a relay unit connected between the base stations and the base station controller. In the method, the relay unit and the base station controller are connected to each other through lines smaller in the number than lines through which the relay unit is connected to the base stations. The base station controller is relayed to the base stations in accordance with the number of assigned channels which number is set by the relay unit for each of the base stations.

SUMMARY OF THE INVENTION

In view of the above-mentioned problems in the conventional wireless local loop access network system, it is an object of the present invention to provide a wireless local loop access network system which is capable of making it possible to use most of radio system units without modification, enabling a public switched telephone network to be connected in the same conditions as conditions in which a public switched telephone network is connected to a wire access network, and making it no longer necessary to connect the wireless local loop access network system to externally additional devices such as HLR and AC.

In one aspect of the present invention, there is provided a wireless local loop access network system including (a) at least one base station making radio communication with a plurality of subscriber's terminals, (b) a base station controller controlling the base station and connected to a public switched telephone network, and (c) a memory designed readably by the base station controller for storing subscriber data therein.

There is further provided a wireless local loop access network system including (a) at least one base station making radio communication with a plurality of subscriber's terminals, and (b) a base station controller controlling the base station and connected to a public switched telephone network, the base station controller including a memory for storing subscriber data therein.

For instance, the memory stores a first identifier used for identifying a subscriber in an interface protocol between the wireless local loop access network system and the public switched telephone network, a second identifier used for identifying a subscriber in an radio-signal interface protocol in the wireless local loop access network system, and data about correspondence between the first and second identifiers.

For instance, the memory stores at least one of first data about a location of each of subscribers, second data about certification of each of subscribers, third data about status of a terminal of each of subscribers, and fourth data about service relating to a radio interface of each of subscribers.

For instance, the third data includes data about whether a subscriber's terminal is blockaded.

For instance, the third data includes data about whether a subscriber's terminal is turned on or off.

For instance, the fourth data includes data about whether a subscriber's voice should be kept secret.

In another aspect of the present invention, there is provided a method of operating a wireless local loop access network system including at least one base station making radio communication with a plurality of subscriber's terminal, a base station controller controlling the base station and connected to a public switched telephone network, and a memory for storing subscriber data therein, the method including the steps of (a) storing data about subscribers in the memory, (b) transmitting an origination message to the base station controller through the base station, when a subscriber hooks his/her terminal off, (c) making access to the data stored in the memory to obtain an address, based on the origination message, the step (c) being carried out by the base station controller, and (d) transmitting a first message together with the address to the public switched telephone network.

For instance, the origination message includes a first identifier for identifying a subscriber.

There is further provided a method of operating a wireless local loop access network system including at least one base station making radio communication with a plurality of subscriber's terminal, a base station controller controlling the base station and connected to a public switched telephone network, and a memory for storing subscriber data therein, the method including the steps of (a) transmitting a registration message to the base station controller through the base station when a subscriber's terminal is powered on, (b) the base station controller, on receipt of the registration message, recognizing that a subscriber's terminal identified by the registration message is located in an area wherein the subscriber's terminal makes communication with the base station, and (c) the base station controller storing a location of the subscriber's terminal in the memory.

It is preferable that the method further includes the step (d) of storing the fact that the subscriber's terminal is powered on, in the memory, the step (d) being carried out by the base station controller.

There is still further provided a method of operating a wireless local loop access network system including at least one base station making radio communication with a plurality of subscriber's terminal, a base station controller controlling the base station and connected to a public switched telephone network, and a memory for storing subscriber data therein, the method including the steps of (a) the public switched telephone network transmitting a first signal to the base station controller, when the public switched telephone network receives a phone call to a subscriber, (b) the base station controller making access to the memory to obtain a first identifier for identifying the subscriber, based on the first signal, (c) the base station controller transmitting a page message to the base station, the page message indicating that a phone call to the subscriber has been received and including the first identifier, (d) the base station, on receipt of the page message, broadcasting the page message therearound, and (e) a terminal of the subscriber recognizing a phone call to itself by knowing that the first identifier, which is an identifier of the terminal, is contained in the thus broadcast page message.

There is yet further provided a method of operating a wireless local loop access network system including at least one base station making radio communication with a plurality of subscriber's terminal, a base station controller controlling the base station and connected to a public switched telephone network, and a memory for storing subscriber data therein, the method including the steps of (a) the public switched telephone network transmitting a port control signal to the base station controller, the port control signal indicating that a certain subscriber is to be blockaded, and including an identifier for identifying the certain subscriber, (b) the base station controller storing that the certain subscriber is to be blockaded, in the memory, (c) the base station controller making access to the memory on receipt of an origination message from the certain subscriber, and knowing that the certain subscriber is presently blockaded, and (d) the base station controller transmitting a message to the certain subscriber through the base station, the message indicating that a phone call to the subscriber should be interrupted.

The advantages obtained by the aforementioned present invention will be described hereinbelow.

The wireless local loop access network system in accordance with the present invention is designed to include a memory, which may be equipped in the base station controller, to store a first identifier in an interface protocol between the wireless local loop access network system and a public switched telephone network, a second identifier in a radio interface protocol, and data indicative of correspondence between the first and second identifiers. Hence, it is no longer necessary for a local exchange in a public switched telephone network to take into consideration that a subscriber is connected to the wireless local loop access network system through a radio interface.

In addition, since the memory further stores various data about subscribers, a CDMA mobile system can be used without modification as an interface in base station transceivers and a base station controller.

Furthermore, since the memory stores data about location and certification of a subscriber, it would be possible to reduce an overhead in data access.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

Hereinbelow is explained a wireless local loop access network system in accordance with the embodiment wherein CDMA is selected as a radio interface, and V5.2 is selected as an interface between the wireless local loop access network system and a public switched telephone network.

Figure 1:
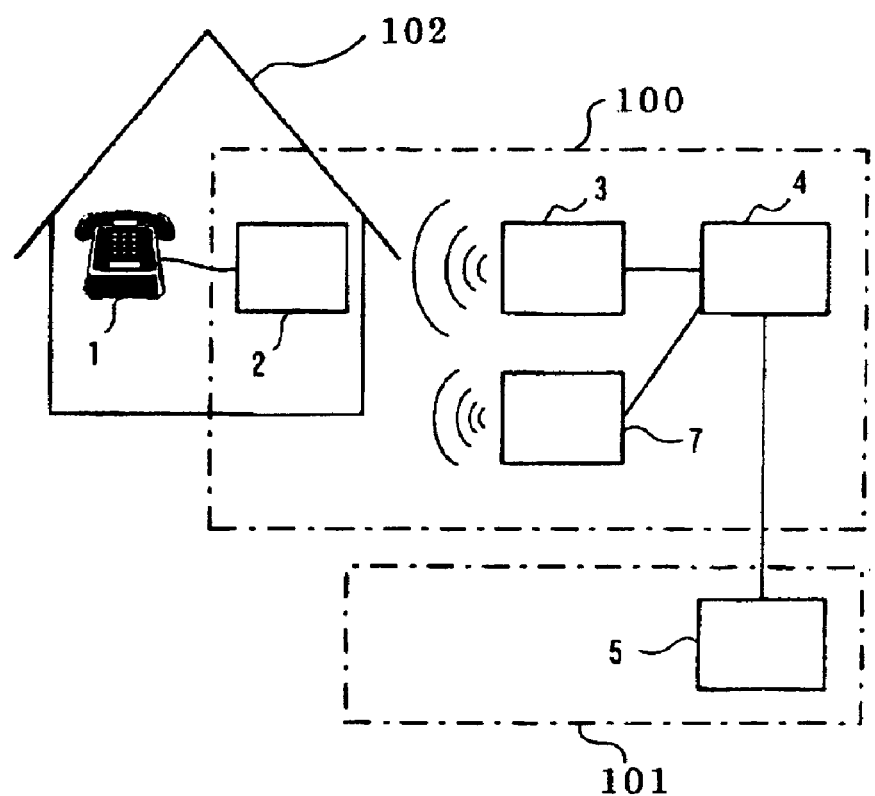
FIG. 1 is a block diagram of a conventional wireless local loop access network system.
Figure 2:
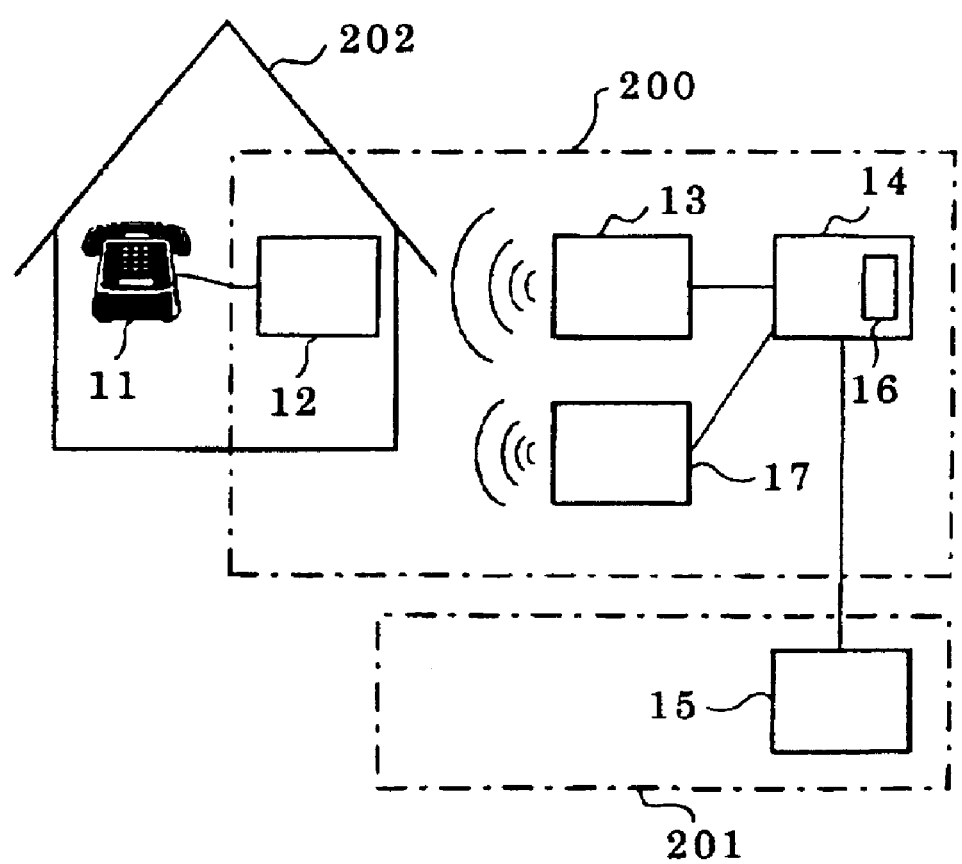
FIG. 2 is a block diagram of a wireless local loop access network system in accordance with an embodiment of the present invention.

FIG. 2 is a block diagram of a wireless local loop access network system 20 in accordance with the embodiment of the present invention.

The wireless local loop access network system 200 is comprised of a subscriber unit (SU) 12 acting as the CDMA radio interface between the wireless local loop access network system 200 and a subscriber's telephone 11, first and second nodes or base station transceivers (BTS) 13 and 17 each acting as the CDMA radio interface between the wireless local loop access network system 200 and the subscriber unit 12, and a node or wireless local loop base station controller (WSC) 14 connecting to a node or local exchange (LE) 15 in a public switched telephone network 201 in accordance with an interface identified as V5.2.

The subscriber's telephone 11 and the subscriber unit 12 are connected to each other through a copper wire acting as an analog interface, and both are set in a subscriber's house 202.

Though the illustrated wireless local loop access network system 200 includes the first and second base station transceivers 13 and 17, it is assumed herein that the subscriber unit 12 makes communication with the first base station transceiver 13.

The subscriber unit 12 and the first base station transceiver 13 are connected through the CDMA radio interface.

The first and second base station transceivers 13 and 17 are connected to the base station controller 14 through an E1 interface and a program inherent to the wireless local loop access network system 200, as an upper layer of the E1 interface.

The base station controller 14 is designed to include a memory 16 for storing data about subscribers therein.

The memory 16 stores therein a first identifier used for identifying a subscriber in an interface protocol between the wireless local loop access network system 200 and the public switched telephone network 201, a second identifier used for identifying a subscriber in an radio interface protocol in the wireless local loop access network system 200, and data about correspondence between the first and second identifiers.

The memory 16 further stores first data about a location of each of subscribers, second data about certification of each of subscribers, third data about status of a terminal of each of subscribers, and fourth data about service relating to a radio interface of each of subscribers.

For instance, the third data includes data about whether a subscriber's terminal is blockaded and/or data about whether a subscriber's terminal is turned on or off. For instance, the fourth data includes data about whether a subscriber's voice should be kept secret.

Hereinbelow is explained an operation of the wireless local loop access network system 200 with reference to FIGS. 3 and 6.

Figure 3:
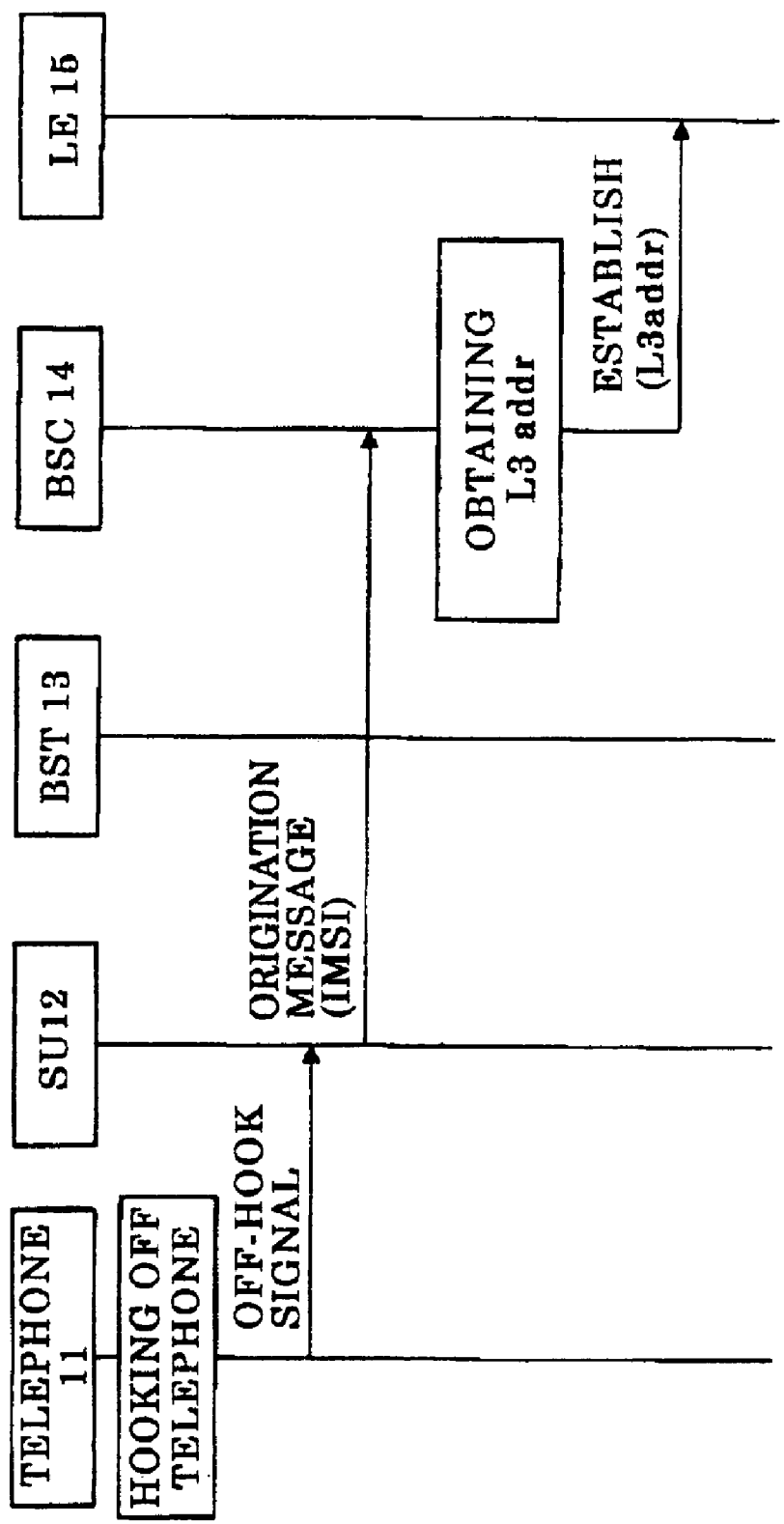
FIG. 3 is a sequence chart showing signals transmitted between nodes when a subscriber calls.

FIG. 3 is a sequence chart showing signals transmitted between nodes when a subscriber makes a phone call.

With reference to FIG. 3, when a subscriber hooks off the telephone 11, an off-hook signal is transmitted to the subscriber unit 12.

On receipt of the off-hook signal, the subscriber unit 12 transmits an origination message to the first base station transceiver 13. The origination message indicates that a phone call is made, and is made in accordance with the CDMA radio protocol. The origination message is transmitted to the base station controller 14 via the first base station transceiver 13.

The thus transmitted origination message includes IMSI, that is, a first subscriber identifier in the CDMA radio protocol.

On receipt of the origination message, the base station controller 14 makes access to the subscriber data stored in the memory 16, and retrieves the subscriber data to obtain an address "L3addr", based on the received origination message including IMSI. The address "L3addr" is a second subscriber identifier in the interface V5.2.

Then, the base station controller 14 transmits a transmission message "ESTABLISH" in the interface V5.2 together with the address "L3addr" to the local exchange 15.

On receipt of the transmission message including the address "L3addr", the local exchange 15 operates in accordance with the interface V5.2.

Figure 4:
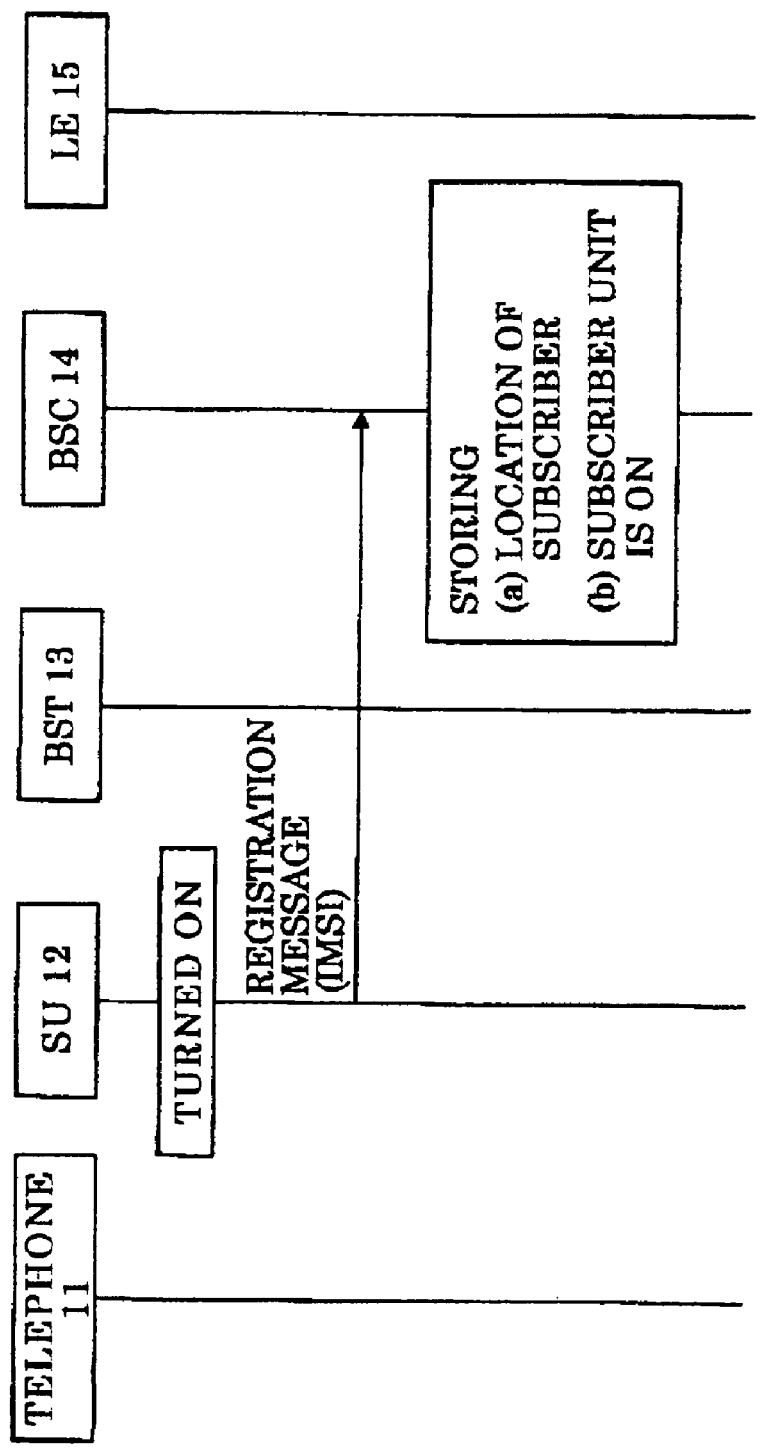
FIG. 4 is a sequence chart showing signals transmitted between nodes when a location of a subscriber is registered at the time when a subscriber turns on his/her terminal.

FIG. 4 is a sequence chart showing signals transmitted between nodes when a location of a subscriber is registered at the time when a subscriber turns on the subscriber unit 12.

When the subscriber unit 12 is powered on, the subscriber unit 12 transmits a registration message to the first base station transceiver 13 in the CDMA radio protocol. The registration message is transmitted to the base station controller 14 via the first base station transceiver 13.

The thus transmitted registration message includes IMSI, that is, a first subscriber identifier in the CDMA radio protocol.

On receipt of the registration message, the base station controller 14 recognizes that the subscriber's telephone 11 identified by the registration message is located in an area wherein the subscriber's telephone 11 makes radio communication with the first base station transceiver 13, based on the fact that the base station controller 14 has received the registration message through the first base station transceiver 13.

Then, the base station controller 14 stores that the subscriber's telephone 11 is located in an area where the first base station transceiver 13 makes radio communication, in the memory 16.

The base station controller 14 further stores that the subscriber unit 12 associated with the subscriber's unit 11 is on.

Figure 5:
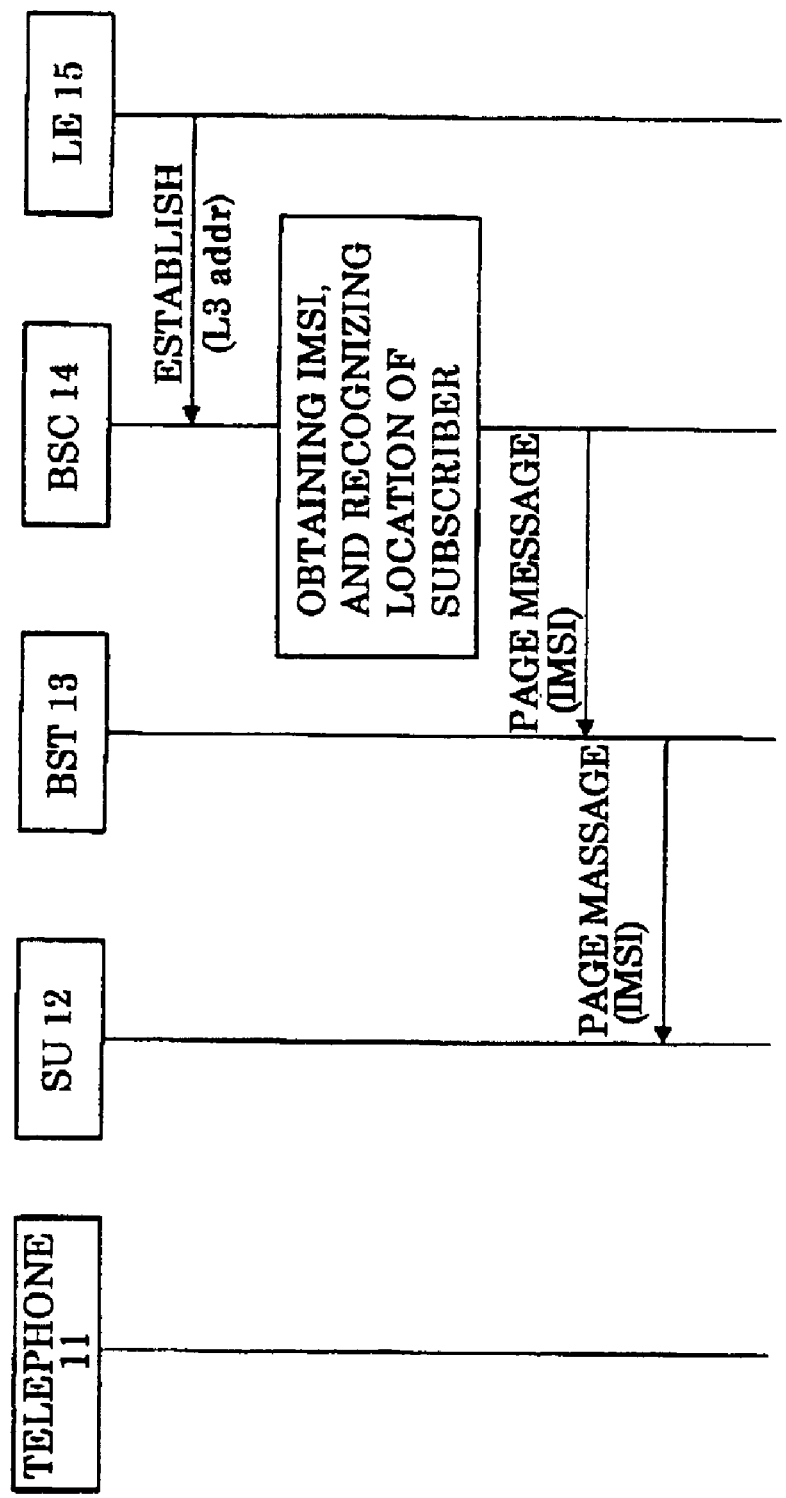
FIG. 5 is a sequence chart showing signals transmitted between nodes when a phone call is made to a subscriber.

FIG. 5 is a sequence chart showing signals transmitted between nodes when a phone call is made to a subscriber.

When the public switched telephone network 201 receives a phone call to a subscriber, the local exchange 15 transmits a signal "ESTABLISH" indicating that a phone call to a subscriber has been received, to the base station controller 14. The signal "ESTABLISH" includes a second subscriber identifier "L3addr" for identifying a subscriber to which a phone call has been made.

On receipt of the signal "ESTABLISH", the base station controller 14 makes access to the subscriber data stored in the memory 16, and retrieves the subscriber data to obtain the first subscriber identifier IMSI, based on the second subscriber identifier "L3addr". In addition, the base station controller 14 recognizes that the subscriber identified by the first subscriber identifier IMSI is located in an area where the first base station transceiver 13 makes radio communication.

Then, the base station controller 14 transmits a page message to the first base station transceiver 13. The page message includes the first subscriber identifier IMSI, and indicates that a phone call has been made to the subscriber identified with the first subscriber identifier IMSI.

On receipt of the page message, the first base station transceiver 13 broadcasts the page message therearound.

On receipt of the page message broadcast by the first base station transceiver 13, the subscriber unit 12 recognizes that the first subscriber identifier IMSI of a subscriber associated with the subscriber unit 12 is contained in the broadcast page message, and thereby recognizes that a phone call has been made to the subscriber unit 12.

Figure 6:
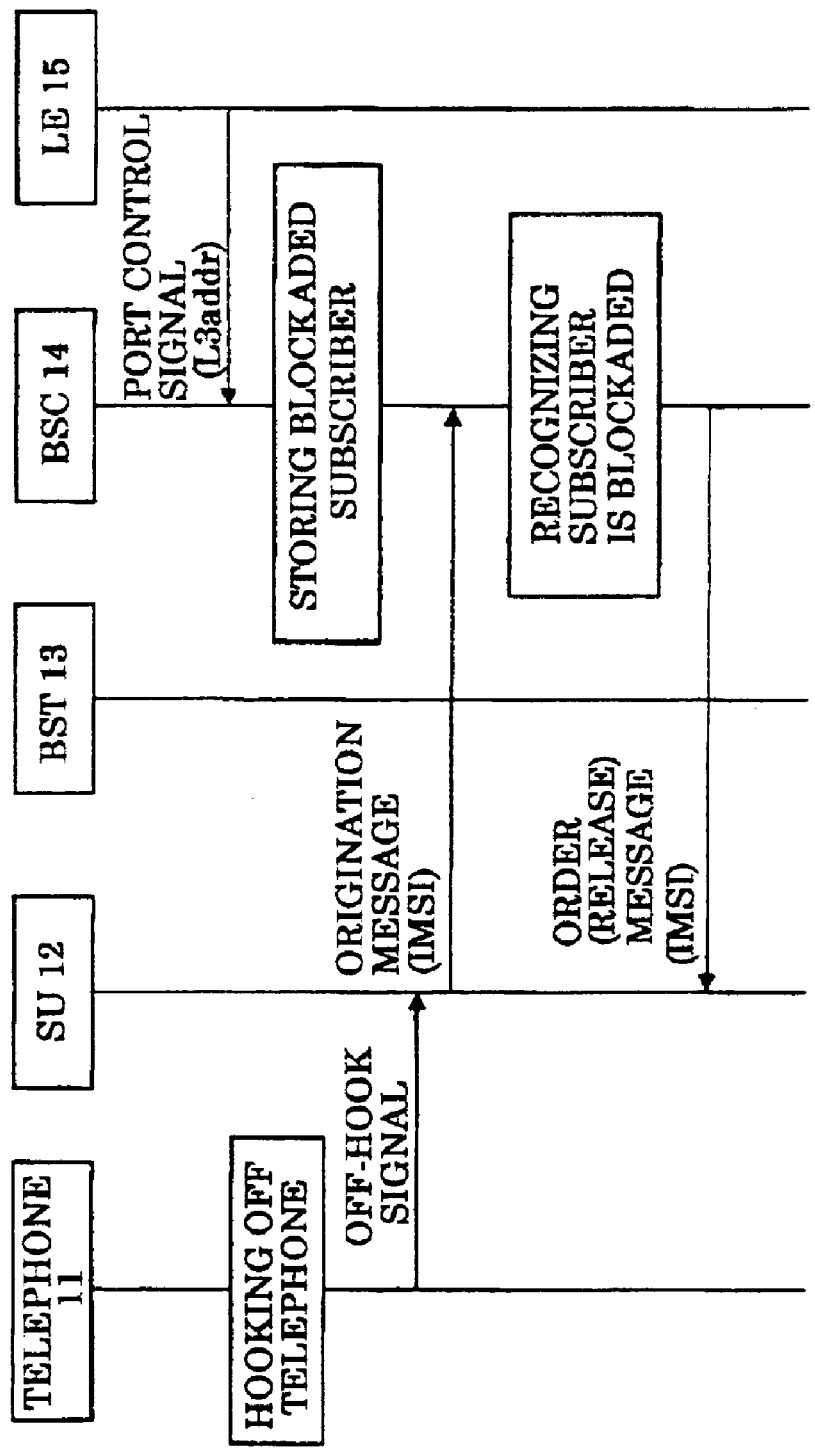
FIG. 6 is a sequence chart showing signals transmitted between nodes when a blockaded subscriber calls.

FIG. 6 is a sequence chart showing signals transmitted between nodes when a blockaded subscriber calls.

When a certain subscriber is to be blockaded, the local exchange 15 in the public switched telephone network 201 transmits a port control signal to the base station controller 14. The port control signal includes the second subscriber identifier "L3addr" of a subscriber to be blockaded, and indicates that a subscriber identified with the second subscriber identifier "L3addr" should be blockaded.

On receipt of the port control signal, the base station controller 14 stores that the subscriber identified with the second subscriber identifier "L3addr" is presently blockaded, in the memory 16.

Thereafter, when a subscriber hooks off the telephone 11, an off-hook signal is transmitted to the subscriber unit 12.

On receipt of the off-hook signal, the subscriber unit 12 transmits an origination message to the base station controller 14 through the first base station transceiver 13. The origination message indicates that a phone call is made, and is made in accordance with the CDMA radio protocol.

The thus transmitted origination message includes the first subscriber identifier IMSI.

On receipt of the origination message, the base station controller 14 makes access to the subscriber data stored in the memory 16, and resultingly, recognizes that the subscriber identified with second subscriber identifier "L3addr" is presently being blockaded.

Then, the base station controller 14 transmits an order or release message to the subscriber unit 12 associated with the subscriber identified with second subscriber identifier "L3addr", through the first base station transceiver 13. The order or release message indicates that a phone call to the subscriber is interrupted.

In the above-mentioned embodiment, though the memory 16 is designed to be equipped in the base station controller 14, it should be noted that the memory 16 may be arranged independently of the base station controller 14, if the memory 16 is designed readable by the base station controller 14.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-360201 filed on Dec. 20, 1999 including specification, claims, drawings and summary is incorporated herein by reference in its entirety.

What is claimed is:

1. A wireless local loop access network system comprising:
   (a) at least one base station making radio communication with a plurality of subscriber terminals;
   (b) a base station controller controlling said at least one base station and connected to a public switched telephone network; and
   (c) a memory designed readable by said base station controller for storing subscriber data therein,
   wherein said memory stores a first identifier used for identifying a subscriber in an interface protocol between said wireless local loop access network system and said public switched telephone network, a second identifier used for identifying the subscriber in a radio-signal interface protocol in said wireless local loop access network system, and data about correspondence between said first and second identifiers so as to eliminate a need for said public switched telephone network to separately determine whether said subscriber is connected to said wireless local loop access network system through said radio-signal interface protocol.

2. The wireless local loop access network system as set forth in claim 1, wherein said memory stores at least one of first data about a location of each subscriber, second data about certification of each subscriber, third data about status of a terminal of each subscriber, and fourth data about service relating to a radio interface of each subscriber.

3. The wireless local loop access network system as set forth in claim 2, wherein said third data includes data about whether a subscriber's terminal is blockaded.

4. The wireless local loop access network system as set forth in claim 2, wherein said third data includes data about whether a subscriber's terminal is turned on or off.

5. The wireless local loop access network system as set forth in claim 2, wherein said fourth data includes data about whether a subscriber's voice should be kept secret.

6. A wireless local loop access network system comprising:
   (a) at least one base station making radio communication with a plurality of subscriber terminals; and
   (b) a base station controller controlling said at least one base station and connected to a public switched telephone network, said base station controller including a memory for storing subscriber data therein,
   wherein said memory stores a first identifier used for identifying a subscriber in an interface protocol between said wireless local loop access network system and said public switched telephone network, a second identifier used for identifying a subscriber in a radio-signal interface protocol in said wireless local loop access network system, and data about correspondence between said first and second identifiers so as to eliminate a need for said public switched telephone network to separately determine whether said subscriber is connected to said wireless local loop access network system through said radio-signal interface protocol.

7. The wireless local loop access network system as set forth in claim 6, wherein said memory stores at least one of first data about a location of each subscriber, second data about certification of each subscriber, third data about status of a terminal of each subscriber, and fourth data about service relating to a radio interface of each subscriber.

8. The wireless local loop access network system as set forth in claim 7, wherein said third data includes data about whether a subscriber's terminal is blockaded.

9. The wireless local loop access network system as set forth in claim 7, wherein said third data includes data about whether a subscriber's terminal is turned on or off.

10. The wireless local loop access network system as set forth in claim 7, wherein said fourth data includes data about whether a subscriber's voice should be kept secret.

11. A method of operating a wireless local loop access network system including at least one base station making radio communication with a plurality of subscriber terminals, a base station controller controlling said base station and connected to a public switched telephone network, and a memory for storing subscriber data therein, said method comprising:

(a) storing data about subscribers in said memory;

(b) transmitting an origination message in a radio protocol to said base station controller through said base station when a subscriber hooks a terminal off;

(c) accessing said data stored in said memory to obtain an address in a public switched telephone network protocol based on said origination message, said step (c) being carried out by said base station controller; and (d) transmitting a first message together with said address in said public switched telephone network protocol to said public switched telephone network so as to eliminate a need for said public switched telephone network to separately determine whether a subscriber is connected to said wireless local loop access network system through said radio protocol.

12. The method as set forth in claim 11, wherein said origination message includes a first identifier for identifying a subscriber.

13. A method of operating a wireless local loop access network system including at least one base station making radio communication with a plurality of subscriber terminals, a base station controller controlling said at least one base station and connected to a public switched telephone network, and a memory for storing subscriber data therein, said method comprising:

(a) said public switched telephone network transmitting a port control signal to said base station controller, said port control signal indicating that a certain subscriber is to be blockaded, and including an identifier for identifying said certain subscriber;

(b) said base station controller storing that said certain subscriber is to be blockaded in said memory;

(c) said base station controller accessing said memory on receipt of an origination message from said certain subscriber, and knowing that said certain subscriber is presently blockaded; and (d) said base station controller transmitting a message to said certain subscriber through said base station, said message indicating that a phone call to said subscriber should be interrupted.

\* \* \* \* \*